(12) United States Patent
Galep et al.

(10) Patent No.: US 10,448,109 B1
(45) Date of Patent: Oct. 15, 2019

(54) SUPPLEMENTAL CONTENT DETERMINATIONS FOR VARIED MEDIA PLAYBACK

(71) Applicant: Amazon Technologies, Inc., Reno, NV (US)

(72) Inventors: Jason Adrian Galep, Seattle, WA (US); Alexei Pineda, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/716,380

(22) Filed: Sep. 26, 2017

(51) Int. Cl.
H04N 21/472 (2011.01)
H04N 21/258 (2011.01)
H04N 21/4402 (2011.01)
H04N 21/81 (2011.01)
H04N 21/435 (2011.01)
H04N 21/2387 (2011.01)

(52) U.S. Cl.
CPC ... *H04N 21/47217* (2013.01); *H04N 21/2387* (2013.01); *H04N 21/25883* (2013.01); *H04N 21/435* (2013.01); *H04N 21/4402* (2013.01); *H04N 21/8126* (2013.01)

(58) Field of Classification Search
None
See application file for complete search history.

(56) References Cited

U.S. PATENT DOCUMENTS

| 2004/0103429 | A1* | 5/2004 | Carlucci | H04N 7/163 725/32 |
| 2005/0076359 | A1* | 4/2005 | Pierson | G11B 27/005 725/32 |
| 2008/0155585 | A1* | 6/2008 | Craner | G11B 27/005 725/32 |
| 2012/0278161 | A1* | 11/2012 | Lazzaro | G06Q 30/0251 705/14.45 |
| 2014/0181634 | A1* | 6/2014 | Compain | G06F 17/2247 715/234 |
| 2016/0234295 | A1* | 8/2016 | Ziring | H04L 67/104 |
| 2017/0374433 | A1* | 12/2017 | Bhogal | H04N 21/812 |

* cited by examiner

Primary Examiner — Ricky Chin
(74) Attorney, Agent, or Firm — Hogan Lovells US LLP

(57) ABSTRACT

Various embodiments allow, as an alternative to skippable content, creation and delivery of secondary or supplemental content which renders differently in fast-forward or another adjusted-speed mode and presents a call for interaction. When primary content on a client device is determined fast-forwarded, through indicators such as embedded markers, an overlay, replacing, or otherwise enhancing supplemental content is selected from a plurality of options and displayed on the device such that it provides a perceptible message and an opportunity for interaction through hyperlinks in the supplemental content. Supplemental content may be in the form of an icon or other static images, a banner display, a series of still images from the primary content, a hyperlinked landing page for interaction, animations, a video clip, or text. Assisting in supplemental content selection, metrics including number of views, quartile reporting, or click-through rates are compiled.

15 Claims, 5 Drawing Sheets

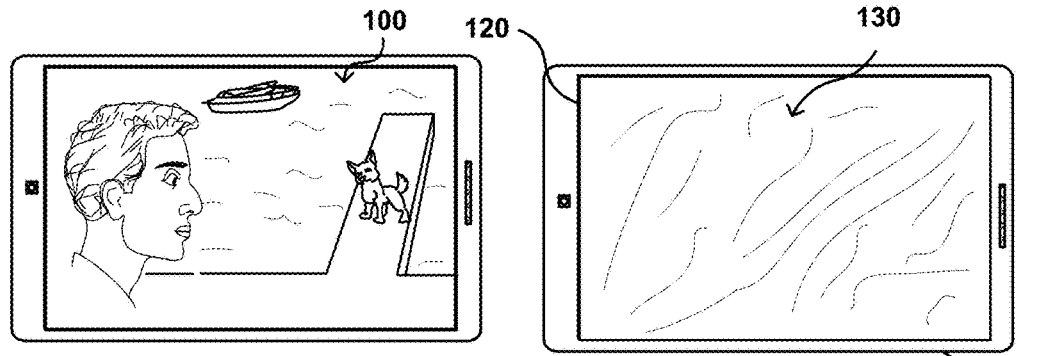
FIG. 1A
(Prior Art)
FIG. 1B
(Prior Art)
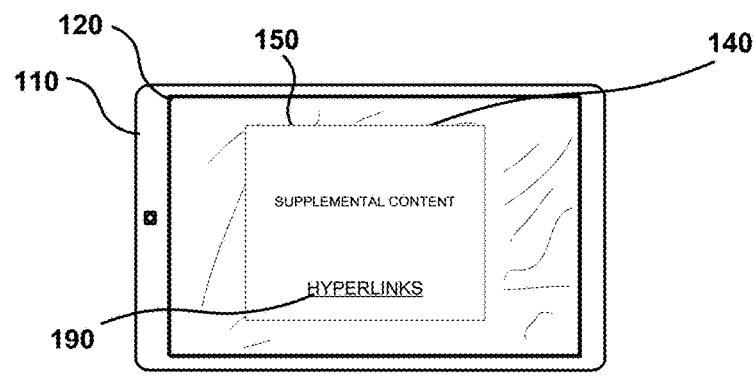
FIG. 2
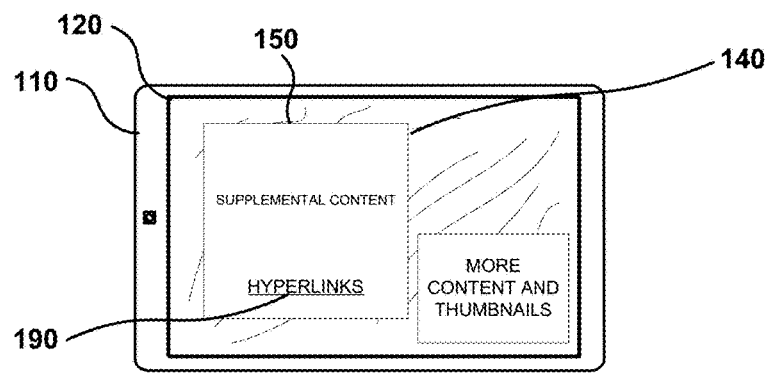
FIG. 3

SUPPLEMENTAL CONTENT DETERMINATIONS FOR VARIED MEDIA PLAYBACK

BACKGROUND

One of the core challenges facing the television and home video-oriented advertising industry was created when home videocassette recorders first appeared and allowed viewers to "time shift" and record programming to a storage medium for viewing after the original broadcasts, with the added ability to "fast-forward" or advance the recordings at speed higher than normal playing speed. The fast-forward capability allowed viewers to bypass, or at least gloss, over advertisements, which tremendously de-valued the advertisement inventory with respect to television and home video. This challenge has been exacerbated by the advent and popularity of the digital video recorder (DVR), a commonly-encountered electronic device with its advanced recording and video manipulation capabilities, capable of recording video in a digital format to a disk drive, flash drive, memory card, or a local or networked mass storage device.

With the growing features and capabilities of DVRs, smart televisions, smartphones, tablets, and other computing devices, as well as exponentially increasing streaming media and video-on-demand offerings, users are increasingly utilizing such devices and services to partake of video content. Commercials are easily skippable on DVRs and these other devices by fast forwarding through them and, in so doing, the viewer at most will perceive a logo or some other snippet of information, but certainly no brand message. The only industry response so far is to allow viewers to skip to the end of a "pre-roll" type of initial advertisement or content after watching so many seconds of it. Providers of supplemental content such as visual advertisers, as well as those offering advertising space and looking for new sources of inventory, thus need a video content format which is perceptible even in a fast-forwarded mode, while remaining customer-centric and not off-putting to the viewing consumer.

BRIEF DESCRIPTION OF THE DRAWINGS

Various embodiments in accordance with the present disclosure will be described with reference to the drawings, in which:

FIGS. 1A and 1B illustrate a prior art result seen when a primary content is fast-forwarded;

FIG. 2 illustrates an example client device display of overlay-type supplemental content when a primary content is fast-forwarded in accordance with various embodiments;

FIG. 3 illustrates another example client device display of supplemental content when a primary content is fast-forwarded in accordance with various embodiments;

DETAILED DESCRIPTION

Figure 4:
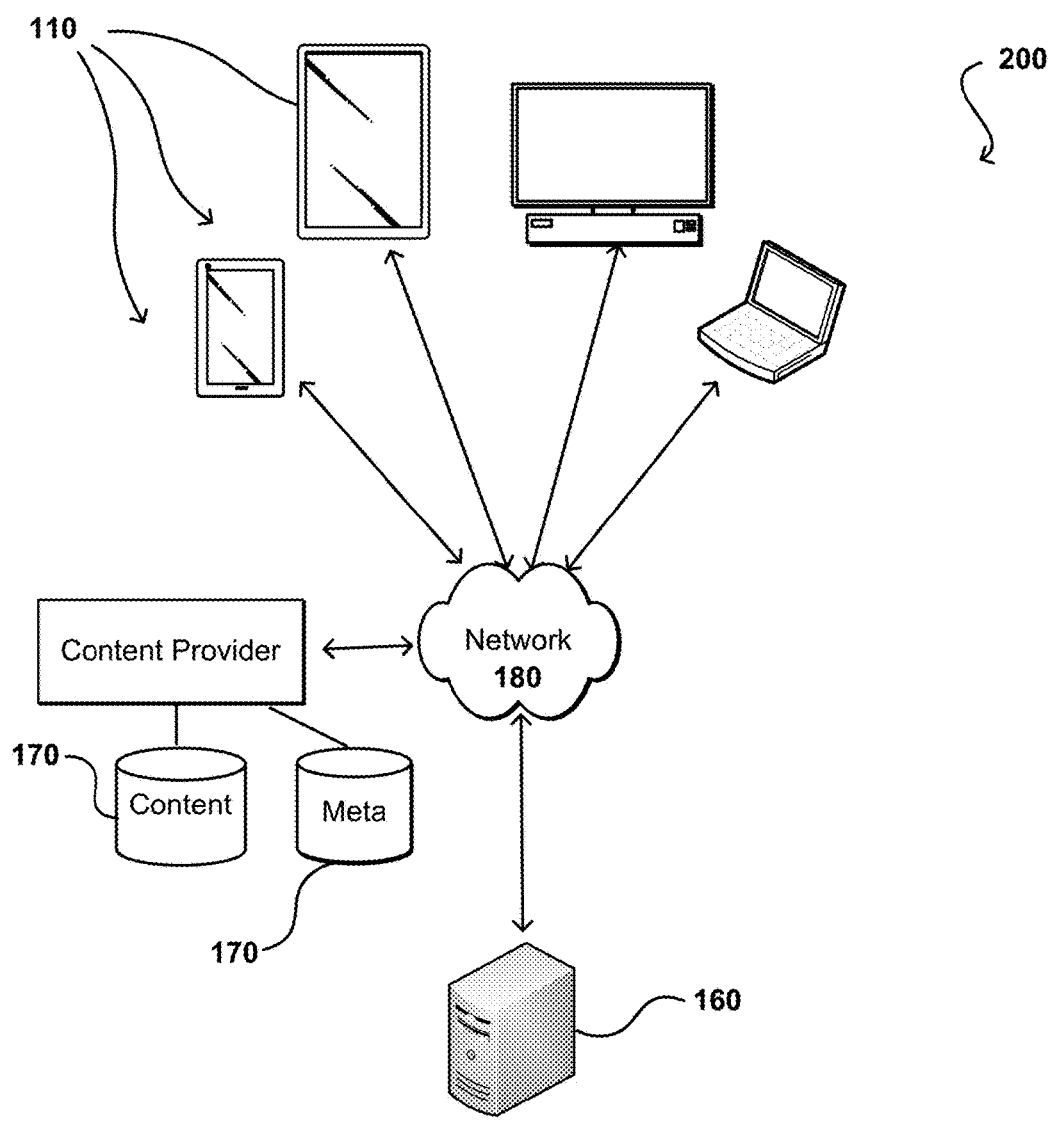
FIG. 4 illustrates an example environment in which portions of the various embodiments can be implemented.

Systems and methods in accordance with various embodiments of the present disclosure may overcome one or more of the aforementioned and other deficiencies experienced in conventional approaches to delivering secondary or supplemental content when the primary content is being fast-forwarded. In particular, various embodiments provide a video or audio format allowing the advertiser or other provider of "mid-roll"-type, polymorphic or multi-format, longer-form supplemental content to create and deliver such content that renders differently in fast-forward mode, and presents a call to action with which the user can interact, even in that fast-forward mode. The supplemental content will be an alternative to skippable content and capable of still delivering a clear brand message to catch the viewers' attention, but remain "friendly" to the viewer and potential customers and saving some of their valuable time. Also being suited for fast-forwarded mode, this format will preserve the value of advertising and other content which is secondary or supplemental to the primary content, be it a motion picture, television program, or some other sort of video or audio presentation.

Enticing the viewer to release the fast-forward button, the supplemental content will be "intelligent" in the modern sense of the word. The injected supplemental message will be different from the commercial normally seen and can be applied in a variety of ways. In one illustrative embodiment, for example, the supplemental content will, in essence, replace the primary content stream based on metadata regarding the primary video feed, specifically as to when the supplemental content may begin and when it must end. The party offering supplemental content may need to obtain the legal right to inject its content, by contracted placement or the like, which is a practice well known in the broadcast industry. In another illustrative embodiment, rather than a wholesale replacement of primary content, the supplemental content may enhance the primary content.

To assist the fast-forwarding viewer, there may be graphic and/or textual elements conveying to the viewer that the currently-displayed content is advertising or other supplemental content, how far along the viewer is in the fast-forwarding process, and how much time remains until the primary content resumes. Such indicators can be in the form of an on-screen icon, displayed while the primary content is simultaneously showing on the majority of the viewer's screen in one embodiment.

Referring now to FIGS. 1A and 1B, shown is a typical result under the prior art when a primary content 100, video content in this case, is fast-forwarded. Under normal playback, as in FIG. 1A, the primary video content 100 is discernible. During a fast-forward or skipping playback mode, as illustrated in FIG. 1B, all that an observer can discern on the client device 110 video player display screen 120 is a series of muddled or noisy image content 130, with no easily perceptible message or meaning during the fast-forwarding. However, approaches in accordance with various embodiments herein enable display of perceptible supplemental content 140 when primary content 100 is advancing on a fast-forward basis, as illustrated in FIG. 2 and FIG. 3, where representative client devices 110 display supplemental content 140 as an overlay atop the primary content 100 presented on a screen 120.

The supplemental content 140 can be an enhancement of primary content 100 being played, such as through an overlay 150, or implemented directly in the video feed which replaces the content being played. The supplemental content 140 can include one or more icons or other static images, an interactive banner-type display, a series of still images from the primary content, a landing page for viewer interaction, animations, a video clip, text messages, or other content suitable for the situation, which can include factoring in the viewer's device 110 and may or may not relate to the substance of the primary content 100. The supplemental content 140 may be in the form of previews or motion picture trailers, and can even be content along the lines of current social media timelines and feeds, news updates, weather forecasts, and sports scores. While the supplemental content 140 may be related in some way to the topic or substance of the primary content 100, such by no means required. The supplemental content 140 can be also customized for a particular viewer, based on demographics and other mined data, including that compiled as discussed herein.

With respect to creation of digital supplemental content 140, at a code level, the familiar Hypertext Markup Language (HTML) can be involved in the creation of content such as animations, banner advertisements, and interactive landing pages, as can Cascading Style Sheets (CSS) files and the JavaScript programming language. Many advertisers, for example, already generate video-based commercials. In one self-service embodiment, supplemental content 140, including that which is sponsored, can be uploaded directly by content producers where a broadcast or streaming service can then add fingerprints or markers and otherwise implement the supplemental content 140 into a collection for enhancing viewers' experiences. In the interests of efficiency and scalability, a software tool may be made available to content creators and used to at least generate template static supplemental content 140, perhaps in an appealing landing page-style arrangement, from supplemental content 140 in a straightforward video format. More specifically, a content creator would upload video content, and software can automatically copy one or more frames from the uploaded content, to serve as static supplemental content 140, and provide the ability for the content creator to add text to the static supplemental content 140 and, for example, select a running length from a variety of defaults.

The systems and methods will entail certain client (as opposed to server) side work and recognize a supplemental content 140 placement opportunity, communicating with at least one server 160 to obtain the appropriate supplemental content 140 in time to render it for the viewer on the client device 110 side. More particularly, when primary content 100 is viewed on a supported DVR or video streaming service, backend content-serving providers and technology can be employed to determine and dynamically match the speed at which the viewer is fast-forwarding (4×, 8×, 16×, etc.) and determine which supplemental content 140 to provide to the viewer's device 110.

There are multiple ways of determining the fast-forward speed, including the use of software to detect local-distribution markers embedded in a broadcast television stream (often used in the advertisement insertion process) and referencing a predetermined programming guide to ascertain which primary content 100 was showing at the time of fast-forwarding. An alternate way is to use the embedded markers to "fingerprint" the primary content 100 video and compare such fingerprints to a database of primary content 100 fingerprints, and, if there is a match, then supplemental content 140 may be used to enhance the primary content 100.

Intelligence behind the fast-forwarding determination may further recognize the type of fast-forwarding performed, particularly if the fast-forward mechanism consists of skipping a certain amount of content (rather than continuous fast-forwarding advancing at a set speed and then being manually stopped by the viewer). Should, for example, such a fast-forward command button or option be pressed or otherwise selected on a client device 110 ten times, the systems and methods herein will not necessarily present the viewer with ten different instances of supplemental content 140, but make an intelligent, informed decision as to the amount of supplemental content 140 to deliver. In one embodiment, should a viewer consecutively select a fast-forward option beyond a threshold number of times, no supplemental content 140 will be shown, and the primary content 100 resumed.

As noted, part of the backend determinations can involve selecting, from a plurality of options, which supplemental content 140 to show to the viewer. On the server side, at least one server 160 will ping, or contact, a database 170, content platform, data store, or similar compilation of supplemental content 140 options and, if necessary or even just desired, may reformat or convert selected supplemental content 140 for proper display on a client device 110. When it comes to selecting a particular supplemental content 140, the algorithm or routine can be polymorphic, or utilizing content of different types and different running lengths, capable of adjusting to different fast-forward speeds. In an illustrative embodiment, the supplemental content 140 collection in a database 170 consists of a series of viewable experiences which can be played for multiple lengths of time on a client device 110 and can be adjusted for particular viewers. One supplemental content 140 display option is to use an animated banner advertisement which is agnostic to, or does not consider, how long it is seen by the viewer. Another possibility for supplemental content 140 is essentially a video which is slowed such that, based on the determined fast-forwarding speed, it appears to be playing at normal speed. In the commercial viewing context, as in the television industry, the running time or length of the supplemental content 140 does not exceed a standard commercial break.

For animated supplemental content 140 for which the viewer changes fast-forwarding speed during the viewing, flexibility is desired, and, in one embodiment, the supplemental content 140 is "smart" enough to detect and dynamically match the fast-forwarding speed. For supplemental content 140 producers not wishing to invest in developing such intelligent content, though, it remains an option for the supplemental content 140 to be static and not synchronize with the fast-forwarding speed.

The supplemental content 140 selection logic can further be configured to ascertain that, based on a higher fast-forwarding speed, a particular viewer is less receptive to advertisements and other supplemental content 140 and accordingly provide a different experience for such a viewer or no supplemental content 140 at all at that time.

As would be apparent to one of ordinary skill in the art, the client device 110 screen 120 may comprise or include a touch screen, electronic ink (e-ink), light emitting diode (LED) display, liquid crystal display (LCD), or cathode ray tube (CRT) display, although devices such as portable media players might additionally or alternatively be utilized to convey information via other means, such as through audio speakers. The client device 110 can include at least one networking component as well and may include one or more components enabling communication across at least one network 180, such as a cellular network, internet, intranet, extranet, local area network, Wi-Fi, and the like.

Specifications and features of the client device 110 on which supplemental content 140 is shown may be detected and factored into the supplemental content 140 selection process, as, say, an older television will have limited interaction and navigation functionality when compared to a modern television or a tablet computer. For example, should the client device 110 not be internet-connected or not be a "smart" device, it is likely that static supplemental content 140 will be selected. So having a static, default version of each animated or interactive supplemental content 140 instance is desirable. Obtainable device 110 data for online devices will be useful in this regard. A feature-rich, potentially high-definition, supplemental content 140 stream will include, and load on such an online viewing device, data capable of facilitating interactivity, including that conducted offline.

In addition, in some embodiments, viewers' advertising-blocking software on certain electronic client devices 110 may be detected and either bypassed through techniques known in the advertising and software industries or requested to be deactivated.

As noted, the selected supplemental content 140 may be related in some way to the primary content 100, but need not be, and may be customized for particular viewers. The signal used for personalizing or customizing the supplement content 140 may include, for example, a date field which could restrict an expired offer from being presented to the viewer and instead lead to the showing of date-generic supplemental content 140. Standard practices and procedures known in the digital advertising industry regarding viewer demographics, standard viewing patterns, selling sponsored commercials, targeting advertisements, and the like can be applied in the supplemental content 140 selection process. Patterns arising over time, based on mined viewing and fast-forwarding data, can assist in this regard and identify viewers less receptive to supplemental content 140 intrusions as well as viewers more likely to interact with supplemental content 140 capable of such. This information can further be utilized in the selection of supplemental content 140 best suited for a particular viewer.

To accomplish the desired playback speed for delivering the selected supplemental content 140, the determined primary content 100 fast-forward speed is considered, such that the supplemental content 140 display speed is reduced in order to appear at a normal speed on the client device 110 during the fast-forward playback mode. Such consideration may include reformatting the selected supplemental content 140 for display on the client device 110, based on the determined fast-forward speed.

In some embodiments, the supplemental content 140 will be delivered as part of primary content 100 being delivered via an online stream or cloud-based, DVR-type services (which saves desired primary content 100 to a playlist, as opposed to a true recording scheme). This would include any advertisement-funded video stream and, for example, services such as the familiar ones offered by providers such as the Hulu® and Netflix® subscription video-on-demand services, the YouTube™ video community, the Dailymotion® video hosting service, and the PlayStation™ Vue live television streaming service. The delivered supplemental content 140 can be stored in a variety of ways, such as locally, and offline, on a viewer's DVR or hard drive, along with the primary content 100.

The selected supplemental content 140 may provide an opportunity for interaction through one or more navigational elements 190 contained within the selected supplemental content 140, including, but not limited to, techniques such as the use of hyperlinks, linking a hypertext file or document to another location or file, typically activated by clicking on a highlighted word or image appearing on the client device 110 screen 120. Should a viewer notice something of interest in supplemental content 140, as noted, he or she can interact with the hyperlinked material 190 in many embodiments, in a manner akin to web browsing. If the viewer's attention is so drawn to the supplemental content 140, and he or she desires to engage with it, the system 200 can return to normal-speed playing of the secondary 140 content and/or the primary content 100. Similarly, if the supplemental content 140 is stopped or paused, play of primary content 100 will resume, with options including restarting the segment which was fast-forwarded, such as a commercial, from the beginning or opting out to another source of related product or service information, such as a website landing page. Should the viewer wish to engage with the supplemental content 140 through the navigational elements 190, in some illustrative embodiments, the primary content 100 will be automatically paused until the viewer has the occasion to return to it.

Should the viewer miss the opportunity to interact with the supplemental content 140, a rewind option can be included to permit the viewer to return to the supplemental content 140 and the interactivity option 190. The well-known media constructs for rewinding and fast-forwarding may be employed in this regard. Another, similar option for missed interactivity is, at the conclusion of the primary content 100, to provide the viewer with an opportunity to see all of the supplemental content 140 which was shown during the primary content 100, potentially through a list, slides, or thumbnail images 210. Accordingly, some sort of list of supplemental content 140 shown during a specific primary content 100 viewing may be maintained, and such a list may be provided to the viewer in a number of ways for interaction, including that conducted offline.

Robust industry-standard measurements, including those required or at least coveted by potential advertisers, can be tracked and preserved, including analytics and metrics such as number of supplemental content 140 views, video quartile reporting (such as what percentage of viewers reached particular quarters of the supplemental content 140), click-through rates (what percentage of viewers interacted with the supplemental content 140 by taking some action with the navigation elements 190). In the sponsored advertising realm, a backend module may track data needed for billing, including that pursuant to advertising insertion contract relationships established and means known in the industry. For example, supplemental content 140 space may be sold on a "cost per click" (CPC) basis, a "cost per thousand impressions" (CPM), or a "cost per acquisition" or "cost per action" (CPA) basis.

Various environments may be utilized to implement the embodiments herein. FIG. 4 illustrates an example of a system 200 environment for such an implementation. As will be appreciated, although an internet or web-based environment 180 is used for purposes of explanation, different environments may be used, as appropriate, to implement various embodiments. An electronic client device 110 can include any appropriate device operable to send and receive requests, messages, or information over an appropriate network and convey content and other information back to a user of the device, particularly through a display screen 120. The network 180 can include any appropriate network, including an intranet, the internet, a cellular network, a local area network, or any other such network or combination thereof. Components used for such a system 200 can depend at least in part upon the type of network 180 and/or environment selected. Protocols and components for communicating via such a network 180 are well known and will not be discussed herein in detail. Communication over the network 180 can be enabled by wired or wireless connections, and combinations thereof. In this example, the network 180 includes the internet, as the environment includes a web server 160 for receiving requests and serving content in response thereto, although for other networks an alternative device serving a similar purpose could be used as would be apparent to one of ordinary skill in the art.

The illustrative environment includes at least one server 160 and can comprise a plurality of resources, servers, hosts, instances, routers, switches, data stores, and/or other such components defining what will be referred to herein as a data plane, although it should be understood that resources of this plane are not limited to storing and providing access to data. It should be understood that there can be several application servers, layers, or other elements, processes, or components, possibly chained or otherwise configured, which can interact to perform tasks such as obtaining data from an appropriate data store. As used herein the term "data store" refers to any device or combination of devices capable of storing, accessing, and retrieving data, which may include any combination and number of databases 170, data servers, data storage devices, and data storage media, in any standard, distributed, or clustered environment. The server 160 can include any appropriate hardware and software for integrating with the data store as needed to execute aspects of one or more applications for the client device 110, handling a majority of the data access and business logic for an application. The server 160 provides admission control services in cooperation with the data store and is able to generate content such as text, graphics, audio, and/or video to be transferred to the user, which may be served to the user by the web server in the form of HTML, XML, or another appropriate structured language in this example. In some embodiments, the server 160, a web server, and similar components can be considered to be part of the data plane. The handling of all requests and responses, as well as the delivery of content between the client device 110 and the server 160, can be handled by a web server. It should be understood that web and application servers are not required and are merely example components, as structured code can be executed on any appropriate device or host machine as discussed elsewhere herein.

The data stores of the data plane can include several separate databases 170, data tables, or other data storage mechanisms and media for storing primary content 100, supplemental content 140, and other data relating to a particular aspect. For example, the data plane can include mechanisms for storing production data and user information, which can be used to serve content for the production side. The data plane also may employ a mechanism for storing log data, which can be used for purposes such as reporting and analysis. It should be understood that there can be many other aspects that may need to be stored in a data store, such as for page image information and access right information, which can be stored in any of the above listed mechanisms as appropriate or in additional mechanisms in the data plane. The data plane is operable, through logic associated therewith, to receive instructions from one or more servers 160 and obtain, update, or otherwise process data, instructions, or other such information in response thereto. In one example, a user might submit a search request for a certain type of content item. In this case, components of the data plane might access user information to verify the identity of a user and access the catalog detail information to obtain information about content items of that type. The information then can be returned to the user, such as in primary content 100, supplemental content 140, and other information on a web page that the user is able to view via a browser on the client device 110. Information for a particular item of interest can be viewed in a dedicated page or window of a browser on a client device 110.

Each server 160 typically will include an operating system that provides executable program instructions for the general administration and operation of that server, and typically will include a computer-readable medium storing instructions that, when executed by a processor of the server, enable the server to perform its intended functions. Suitable implementations for the operating system and general functionality of the servers are known or commercially available, and are readily implemented by persons having ordinary skill in the art, particularly in light of the disclosure herein.

The environment in some embodiments is a distributed computing environment utilizing several computer systems and components that are interconnected via communication links, using one or more computer networks 180 or direct connections. However, it will be appreciated by those of ordinary skill in the art that such a system 200 could operate equally well in a system having fewer or a greater number of components than are illustrated in FIG. 4. Thus, the depiction of the system 200 in FIG. 4 should be taken as being illustrative in nature, and not limiting to the scope of the disclosure.

An environment such as that illustrated in FIG. 4 can be useful for various supplemental content 140 providers or other entities, wherein multiple hosts and various types of resources might be used to perform tasks such as serving content, authenticating users, allocating resources, or performing any of a number of other such tasks. Some of these hosts may be configured to offer similar functionality, while other servers might be configured to perform at least some different functions. It should be noted the electronic environment in such cases might include additional components and/or other arrangements, discussed in detail above.

As discussed, the various embodiments can be implemented in a wide variety of operating environments, which in some cases can include one or more DVRs, smartphones or other computing devices, or processing devices which can be used to operate any of a number of applications. Client devices 110 can include any of a number of general purpose personal computers, such as desktop or laptop computers running a standard operating system, tablet computers, as well as smartphones and other cellular, wireless, and handheld devices running mobile software and capable of supporting a number of networking and messaging protocols. Such a system 200 also can include a number of workstations running any of a variety of commercially-available operating systems and other known applications for purposes such as development and database 170 management. These devices also can include other electronic devices, such as dummy terminals, thin-clients, gaming systems, handheld messaging devices, set-top boxes, personal data assistants, electronic book readers, and other devices capable of communicating via a network 180.

Various aspects also can be implemented as part of at least one service or web service, such as may be part of a service-oriented architecture. Services such as web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network 180 that would be familiar to those skilled in the art for delivering and supporting communications, including those using any of a variety of commercially-available protocols, such as TCP/IP, OSI, FTP, UPnP, NFS, CIFS, and AppleTalk. The network 180 can include, for example, a broadcast television network, a cable television network, a satellite television network, a local area network, a wide-area network, a virtual private network, the internet, an intranet, an extranet, a public switched telephone network, an infrared network, a wireless network, and any combination thereof.

In embodiments utilizing a web server 160, the web server can run any of a variety of server or mid-tier applications, including HTTP servers, FTP servers, CGI servers, data servers, Java servers, and business application servers. The server(s) 160 also may be capable of executing programs or scripts in response requests from client devices 110, such as by executing one or more web applications that may be implemented as one or more scripts or programs written in any programming language, such as Java®, C, C# or C++, or any scripting language, such as Perl, Python, or TCL, as well as combinations thereof. The server(s) 160 may also include database servers, including without limitation those commercially available from Oracle®, Microsoft®, Sybase®, and IBM®.

The system 200 environment can include a variety of database 170 compilations, data stores, and other memory and storage media as discussed above. These can reside in a variety of locations, such as on a storage medium local to (and/or resident in) one or more of the computers or remote from any or all of the computers across the network 180. In a particular set of embodiments, the information may reside in a storage-area network (SAN) familiar to those skilled in the art. Similarly, any necessary files for performing the functions attributed to the computers, servers, or other network 180 devices may be stored locally and/or remotely, as appropriate. Where a system 200 includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system 200 may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system 200 and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network 180 input/output devices may be employed.

Storage media and computer readable media for containing primary content 100, supplemental content 140, or code, or portions of content code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

Figure 5:
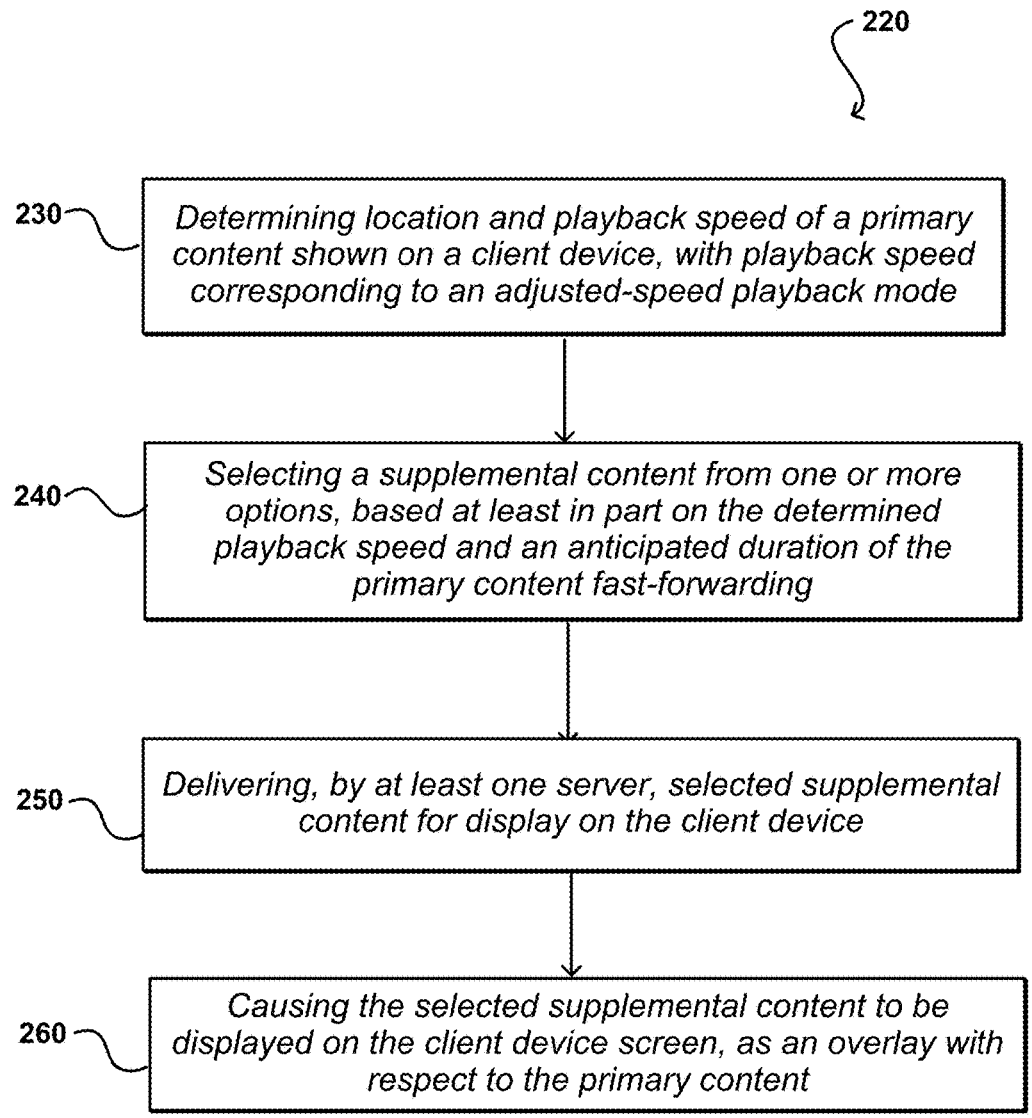
FIG. 5 is a flowchart illustrating an example process for detecting when a primary content is fast-forwarded and selecting and displaying a supplemental content in accordance with various embodiments.

FIG. 5 illustrates an example process 220 for detecting when a primary content 100 is fast-forwarded and selecting and displaying a supplemental content 140 in accordance with various embodiments. It should be understood that, for any process discussed herein, there can be additional, fewer, or alternative steps performed in similar or alternative orders, or in parallel, within the scope of the various embodiments unless otherwise stated. In this example, the process commences 230 by determining a location and playback speed of a primary content 100 being shown on a client device 110. As discussed, determining the playback speed may involve software detecting markers embedded in a stream and cross-referencing a primary content 100 programming guide or "fingerprinting" the primary content and comparing the fingerprints to a database 170 or data store fingerprints. Further analysis may recognize a type of fast-forwarding performed, such as if a certain amount of content is skipped in the process.

When it is determined that the playback on the client device 100 is in a fast-forward mode, the process moves on 240 to selecting a supplemental content 140 from one or more options, with this selection based at least in part on the determined playback speed and an anticipated duration of the fast-forwarding. The selection process algorithm or logic may follow that discussed herein. In particular, at least one server 160 can contact, a database 170, content platform, data store, or other compilation of supplemental content 140 options, which may be played for varying lengths of time and be adjustable or customizable for specific viewers. Further steps are to deliver 250, by at least one server 160, the supplemental content 140 for display on the client device 110 and cause 260 the selected supplemental content 140 to be displayed on the client device 110 screen 120, as an overlay 150 with respect to the primary content 100. The playback speed for the selected and displayed supplemental content 140 can be reformatted or otherwise based on the primary content 100 fast-forward speed, so that the display speed of the supplemental content 140 appears to be occurring at a normal speed on the client device 110 during the fast-forward mode.

Figure 6:
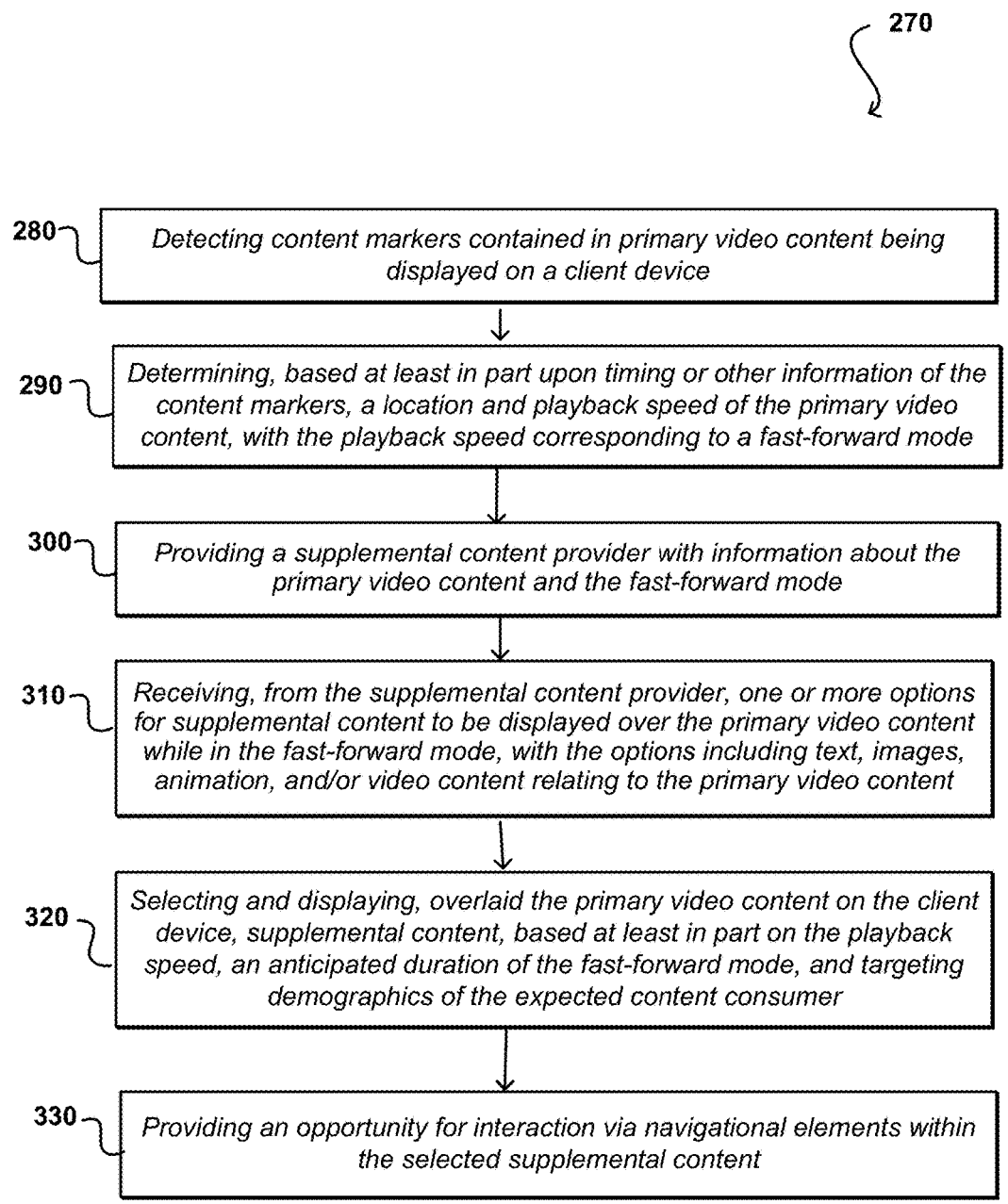
FIG. 6 is a flowchart illustrating another example process for detecting when a primary content is fast-forwarded and selecting and displaying a supplemental content in accordance with various embodiments.

FIG. 6 illustrates another example process 270 for selecting and displaying a supplemental content 140 when a primary content 100 is advancing in a fast-forward mode. An initial step 280 is to detect one or more content markers embedded or otherwise contained in primary video content 100 being played or displayed on a client device 110. As mentioned previously, this step 280 can involve cross-referencing a primary content programming guide or a database 170 of primary content 100 "fingerprints." Based at least in part upon the timing of the content markers or other referenced content marker-related information, the primary video content 100 location and playback speed are determined as process steps 290, including detecting when the primary video content 100 is being fast-forwarded. When the primary content 100 is detected to be in a fast-forward playback mode, a supplemental content 140 provider is presented 300 with specific information about the primary video content 100 and the fast-forward playback mode, such as the primary content 100 topic and the speed of the fast-forward advancement. The supplemental content 140 provider will offer 310 one or more options for supplemental content 140 to be displayed over, and thereby enhance, the primary video content 100 while the fast-forward playback mode continues. As noted, the various supplemental content 140 options may include an icon or other static images, an interactive banner-type display, a series of still images from the primary content, a hyperlinked 190 landing page for interaction, animations, a video clip, or text relating to the primary content 100. At that point 320, based at least in part on the determined playback speed, an anticipated duration of the fast-forwarding playback mode, and targeting demographics of the expected content consumer, a particular supplemental content option 140 is selected and displayed on the client device 110, as an overlay 150 with respect to the primary video content 100. The targeting demographics which are utilized at this step can be grouping traits known in the advertising industry, such as gender, age, location, and annual income, and they can include the industry-standard analytics and metrics referenced herein. As discussed, the selected supplemental content 140 can then 330 provide an opportunity for viewer interaction through one or more navigational elements, such as hyperlinks 190, embedded or contained within the selected supplemental content 140.

It should be noted that, while the present disclosure often refers to videos, viewers, and DVRs, such is by no means limiting, and the supplemental content 140 and primary content 100 may be in alternative forms, such as an audio-only stream, including podcasts and that delivered by intelligent personal assistants on electronic devices 110. Moreover, for the avoidance of doubt, the supplemental content 140 need not consist of advertising; it instead could consist of any sort of content. For example, supplemental content 140 could summarize the fast-forwarded primary content 100 or otherwise enhance the primary content 100, such as through a map illustrating where the primary content 100 action is taking place or displaying an indication of bonus content to come after the conclusion of the primary content 100. Further, while the term "fast-forwarding" is used for convenience, it is also not intended to be limiting, and the term should be construed to encompass any sort of adjusted-speed play of content.

Figure 7:
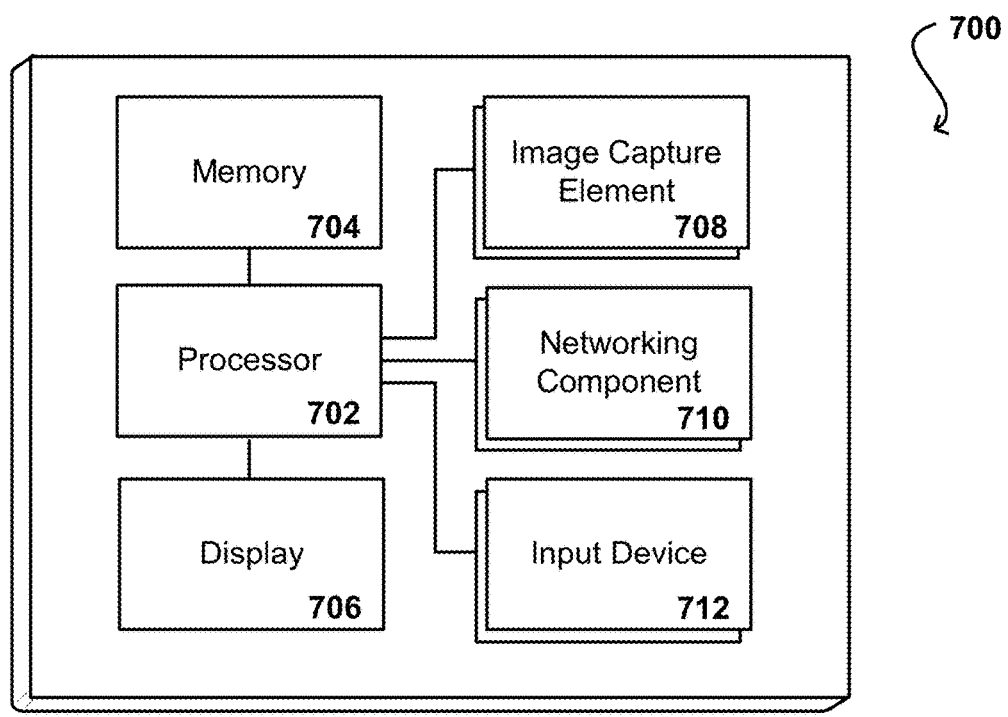
FIG. 7 illustrates components of an example computing device that can be used in accordance with various embodiments.

FIG. 7 illustrates a set of basic components of a computing device 700 that can be used to implement aspects of the various embodiments, including a client device 110. In this example, the device includes at least one processor 702 for executing instructions that can be stored in a memory device or element 704. As would be apparent to one of ordinary skill in the art, the device can include many types of memory, data storage or computer-readable media, such as a first data storage for program instructions for execution by the at least one processor 702, the same or separate storage can be used for images or data, a removable memory can be available for sharing information with other devices, and any number of communication approaches can be available for sharing with other devices. The device typically will include at least one type of display element 706, such as a touch screen, electronic ink (e-ink), organic light emitting diode (OLED) or liquid crystal display (LCD), although devices such as portable media players might convey information via other means, such as through audio speakers. The device in many embodiments will include at least one image capture element 708, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc. The device can include at least one networking component 710 as well, and may include one or more components enabling communication across at least one network 180, such as the internet, a cellular network, intranet, extranet, local area network, Wi-Fi, and the like.

The device can include at least one motion and/or orientation determining element, such as an accelerometer, digital compass, electronic gyroscope, or inertial sensor, which can assist in determining movement or other changes in orientation of the device. The supplemental content 140 can, at least in part, depend on readings from such motion and/or orientation determining element. The device can include at least one additional input device 712 able to receive conventional input from a user. This conventional input can include, for example, a push button, touch pad, touch screen, wheel, joystick, keyboard, mouse, trackball, keypad or any other such device or element whereby a user can input a command to the device. These input/output (I/O) devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As noted, the various embodiments can be implemented in a wide variety of operating environments, which in some cases can include one or more user computers or computing devices which can be used to operate any of a number of applications. The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting one or more content markers contained in primary video content being displayed via a client device;
   determining, based at least in part upon a timing or information of the content markers, a location and playback speed of the primary video content by the client device, the playback speed corresponding to a fast-forward playback mode;
   providing, to a supplemental content provider, information about the primary video content and the fast-forward playback mode;
   receiving, from the supplemental content provider, one or more options for supplemental content to be displayed over the primary video content while in the fast-forward playback mode, the one or more options including at least one of text, image content, animation, or video content relating to the primary video content;
   compiling supplemental content metrics including at least click-through rates;
   selecting a selected supplemental content from the one or more options, based at least in part on the determined playback speed, an anticipated duration of the fast-forward playback mode, demographics of an expected content consumer, of and the supplemental content metrics;
   causing the selected supplemental content to be displayed, via the client device, as an overlay with respect to the primary video content, the selected supplemental content containing one or more navigational elements;
   reducing a second playback speed of the selected supplemental content, based on the determined fast-forward speed, such that the supplemental content is displayed at a normal speed during the fast-forward playback mode; and
   providing an opportunity for interaction through the one or more navigational elements in the selected supplemental content, the opportunity for interaction capable of resuming at least one of the playback speed of the primary video content or the second playback speed of the selected supplemental content.

2. The computer-implemented method of claim 1, further comprising:
   reformatting the selected supplemental content for display on the client device, based on the determined fast-forward speed.

3. The computer-implemented method of claim 1, wherein the supplemental content metrics include at least one of a number of views, supplemental content display patterns arising over time, or quartile reporting.

4. A computer-implemented method, comprising:
   determining a location and a playback speed of a primary content by a client device, the playback speed corresponding to an adjusted-speed playback mode;
   compiling supplemental content metrics including at least click-through rates;
   selecting a supplemental content from one or more options, based at least in part on the determined playback speed, an anticipated duration of the adjusted-speed playback mode, and the supplemental content metrics;
   delivering, by at least one server, the supplemental content for display on the client device;
   causing the selected supplemental content to be displayed, via the client device, as an overlay with respect to the primary content;
   reducing a second playback speed of the selected supplemental content, based on the determined playback speed, such that the supplemental content is displayed at a normal speed during the determined adjusted-speed advancement of the primary content; and
   providing an opportunity for interaction through one or more navigational elements within the selected supplemental content, the opportunity for interaction capable of resuming at least one of the playback speed of the primary content or the second playback speed of the selected supplemental content.

5. The computer-implemented method of claim 4, further comprising:
   contacting, by the at least one server, a content platform or database containing a plurality of supplemental content options capable of being displayed or played for varying lengths of time.

6. The computer-implemented method of claim 4, further comprising:
   detecting one or more content markers embedded in the primary content; and utilizing the one or more content markers to assist in determining at least one of the location and playback of the primary content.

7. The computer-implemented method of claim 4, wherein the supplemental content includes at least one of text, image content, animation, or video content relating to the primary content.

8. The computer-implemented method of claim 4, further comprising:
   reformatting the selected supplemental content for display on the client device, based on the determined playback speed.

9. The computer-implemented method of claim 4, further comprising:
   replacing the primary content with the selected supplemental content, based on metadata in a feed on the client device.

10. The computer-implemented method of claim 4, further comprising:
    storing the supplemental content locally on the client device.

11. The computer-implemented method of claim 4, wherein the supplemental content metrics include:
    at least one of a number of views, supplemental content display patterns arising over time, or quartile reporting.

12. A computing system, comprising:
    at least one processor; and
    memory including instructions that, when executed by the at least one processor, cause the computing system to:
    determine a location and a playback speed of a primary content by a client device, the playback speed corresponding to an adjusted-speed playback mode;
    compile supplemental content metrics including at least click-through rates;
    select a supplemental content from one or more options, based at least in part on the determined playback speed, an anticipated duration of the adjusted-speed playback mode, and the supplemental content metrics;
    deliver, by at least one server, the selected supplemental content for display on the client device;
    cause the selected supplemental content to be displayed, via the client device, as an overlay with respect to the primary content;
    reduce a second playback speed of the selected supplemental content, based on the determined playback speed, such that the supplemental content is displayed at a normal speed during the determined adjusted-speed playback mode of the primary content; and provide an opportunity for interaction through one or more navigational elements within the selected supplemental content, the opportunity for interaction capable of resuming at least one of the playback speed of the primary content or the second playback speed of the selected supplemental content.

13. The computing system of claim 12, wherein the instructions when executed further cause the computing system to:

contact a content platform or database containing a plurality of supplemental content options capable of being displayed or played for varying lengths of time.

14. The computing system of claim 12, wherein the instructions when executed further cause the computing system to:

detect one or more content markers embedded in the primary content; and utilize the one or more content markers to assist in determining at least one of the location and playback of the primary content.

15. The computing system of claim 12, wherein the instructions when executed further cause the computing system to:

reformat the selected supplemental content for display on the client device, based at least in part on the determined playback speed.

\* \* \* \* \*